Sept. 29, 1953     J. L. BUTLER     2,653,397
SNOWPLOW ATTACHMENT FOR LAWN SHEARS
Filed Feb. 10, 1950
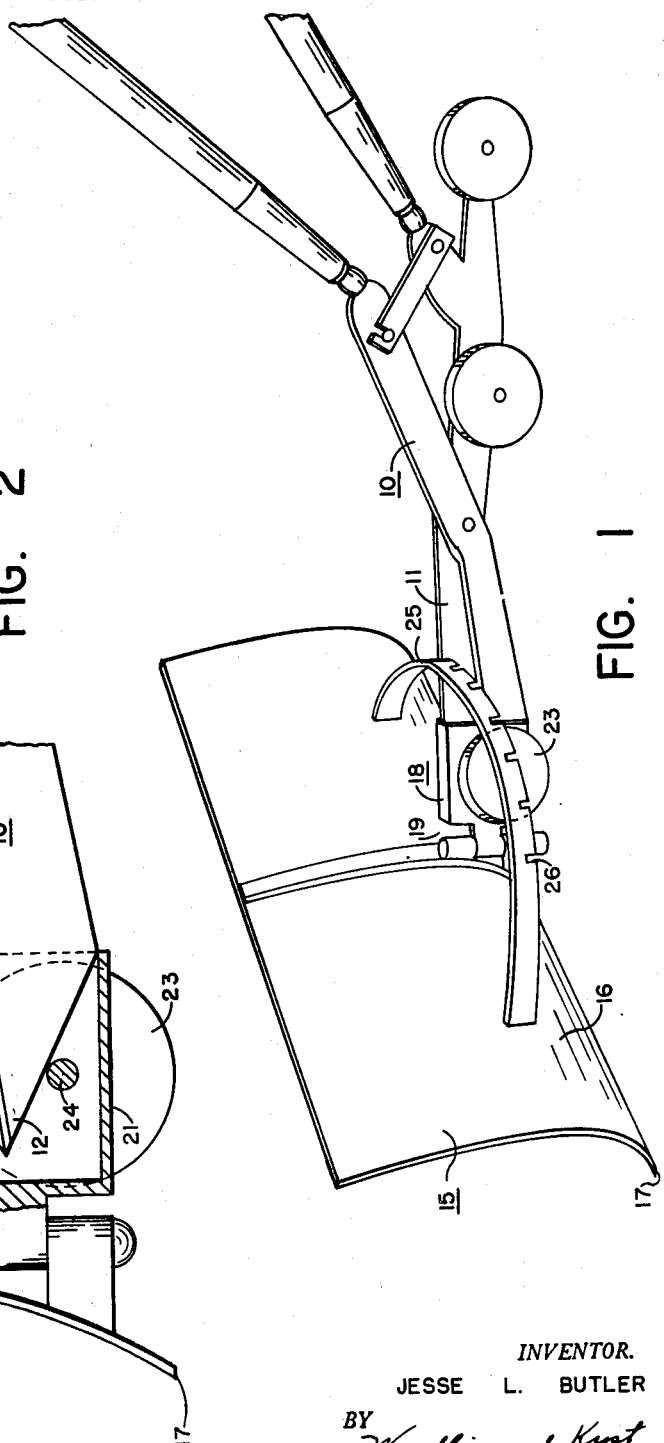
*INVENTOR.*
JESSE L. BUTLER
BY Woodling and Krost
*his Attorneys.*

Patented Sept. 29, 1953

2,653,397

UNITED STATES PATENT OFFICE 2,653,397

SNOWPLOW ATTACHMENT FOR LAWN SHEARS

Jesse L. Butler, Cleveland, Ohio

Application February 10, 1950, Serial No. 143,545

2 Claims. (Cl. 37—53)

This invention relates to a snow shovel adapted to be used with scooter lawn shears.

Many times during the winter, it is very desirous to have a small snow plow which may be pushed by hand for cleaning sidewalks. The average person, however, wants a snow plow which may be easily stored in a very small place and which is inexpensive to purchase. Therefore, one of the objects of my invention is to provide an inexpensive, yet sturdy, snow plow attachment for use with a scooter lawn shears.

Another object of my invention is to provide a snow plow attachable to a lawn shears wherein the snow plow may be held at a desired angle relative to the lawn shears.

Other objects and a fuller understanding of this invention may be had by referring to the following description and claims, taken in conjunction with the accompanying drawing, in which:

Figure 1 of my drawing is a picture view of a snow plow attached to the lawn shears with the shovel disposed at an angle to the shears; and Figure 2 is a fragmentary enlargement in cross-section illustrating the mounting of the shovel on the lawn shears.

The lawn shears illustrated in the drawing by the reference character 10 are fully illustrated and disclosed in the Patent Number 2,488,374, issued on November 15, 1949, to J. L. Butler. The snow plow has been designed for use with these lawn shears 10, however, it is understood that the structure may be incorporated in snow plows of other designs which may be attachable to other lawn shears without departing from the spirit and scope of the invention. The lawn shears 10 have at least a cutting blade 11, the drawings indicating two aligned cutting blades 11 which terminate in the nose 12 which may be referred to as the nose of the lawn shears 10.

The snow plow comprises a shovel 15 having a back side 16 and a bottom edge 17. Attached to the back side 16 near the bottom 17 of the shovel 15 and intermediate the ends of the shovel is a blade receiving socket 18. This blade receiving socket 18 is hingedly fastened to the shovel 15 by a hinge 19 with the pivot axis of the hinge extending substantially vertically when the shovel is being used.

In this instance, the blade receiving socket 18, as is best illustrated in Figure 2, is of substantially rectangular shape to closely fit the nose 12 of the lawn shears 10. When lawn shears having a pushing nose or other shape are to be used with the snow plow, the blade receiving socket 18 should be of such shape to conform to and tightly receive the blade or nose. In the present instance, the blade receiving socket 18, being rectangular, has a top wall 20 and a bottom wall 21 interconnected by side walls 22. The side walls are spaced apart a distance substantially equal to the thickness of the blades 11 or the nose 12 of the lawn shears 10. The top and bottom walls are spaced apart a distance substantially equal to the height or width of the blades 11.

It has been found advisable to rotatably mount at least a wheel 23 on the blade receiving socket 18 to help stabilize the shovel 15 while the snow plow is being used. In the present instance, I have used two wheels, one on each side of the blade receiving socket 18. Each of these wheels is rotatably mounted on an axle 24, which axle is carried by its respective side wall 22.

Since the blade receiving socket 18 is hingedly mounted on the back side of the shovel 15, it is preferable to provide a holding strap 25 fastened to the shovel and holdingly engageable with the cutting blade 11 to hold the shovel at a desired angle relative to the lawn shears 10. This holding strap 25 in this instance is of an arc shape and is fastened at each end thereof to the back side of the shovel 15. A plurality of spaced notches 26 in the bottom edge of this holding strap 25 provide the adjustment and hold the shovel at the desired angle relative to the lawn shears. By inserting the blade 11 in the desired notches, the shovel may be positioned and held at that position or angle relative to the lawn shears for moving snow to the side of the path as the snow plow is being pushed forward.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A snow plow attachable to a handle with a grasping portion and a lower portion which has two wheels longitudinally spaced for rollably supporting said lower portion on a surface to be cleaned of snow, said lower portion having an upper edge, said snow plow comprising a scraper blade of sheet material having a back, a bottom edge and two upright side edges, a hinge member having an axis and fastened to the lower central portion of the back of said scraper blade, a socket of generally rectangular cross section fastened to said hinge member for hinge movements relative to said scraper blade, said socket adapted to closely receive the end of the lower portion of said handle for movement therewith, roller wheels journaled on each side of said socket so that when said handle lower portion is received in said socket all four wheels will rest on a plane surface, said hinge axis being perpendicular to such plane surface to permit said bottom edge of said scraper blade to be partially rotatable substantially in said plane surface, an arcuate holding strap of substantially 180 degrees having the two ends thereof fastened to the back of said scraper blade at points equidistant from the hinge member and near said side edges, the radius of said arc exceeding the distance between the hinge axis and the extreme end of said socket, said holding strap having notches on the underside thereof, said holding strap defining a plane which is substantially parallel to said plane surface and which substantially intersects the uppermost wall of said socket, whereby the upper edge of the lower portion of said handle passes through and engages any one of said notches in said arcuate holding strap when said lower portion is received in said socket.

2. A snow plow attachable to lawn shears having a handle with a grasping portion and a lower portion which has two wheels longitudinally spaced for rollably supporting said lower portion on a surface to be cleaned of snow, said lower portion having an upper edge, said snow plow comprising a scraper blade of sheet material having a back, a bottom edge and two upright side edges, a hinge member having an axis and fastened to the lower central portion of the back of said scraper blade, a socket of generally rectangular cross section fastened to said hinge member for hinge movements relative to said scraper blade, said socket adapted to closely receive the end of the lower portion of said handle for movement therewith, roller wheels journaled on each side of said socket to be disposed relative to the two wheels of the lawn shears when said lawn shears are received in said socket so that all four wheels will rest on a plane surface, said hinge axis being perpendicular to such plane surface to permit said bottom edge of said scraper blade to be partially rotatable substantially in said plane surface, an arcuate holding strap of substantially 180 degrees having the two ends thereof fastened to the back of said scraper blade at points equidistant from the hinge member and near said side edges, the radius of said arc exceeding the distance between the hinge axis and the extreme end of said socket, said holding strap having notches on the underside thereof, said holding strap defining a plane which is substantially parallel to said plane surface and which substantially intersects the uppermost wall of said socket, whereby the upper edge of the lower portion of said lawn shears passes through and engages any one of said notches in said arcuate holding strap when said lower portion is received in said socket.

JESSE L. BUTLER.

References Cited in the file of this patent

UNITED STATES PATENTS

| Number | Name | Date |
|---|---|---|
| 788,421 | McInnerny | Apr. 25, 1905 |
| 1,561,368 | Staley | Nov. 10, 1925 |
| 1,847,133 | Nieman | Mar. 1, 1932 |
| 2,488,374 | Butler | Nov. 15, 1949 |
| 2,530,856 | Callahan | Nov. 21, 1950 |